Dec. 4, 1962 L. S. WILLIAMS 3,066,860
CHART READING MECHANISM
Original Filed June 24, 1957 6 Sheets-Sheet 1
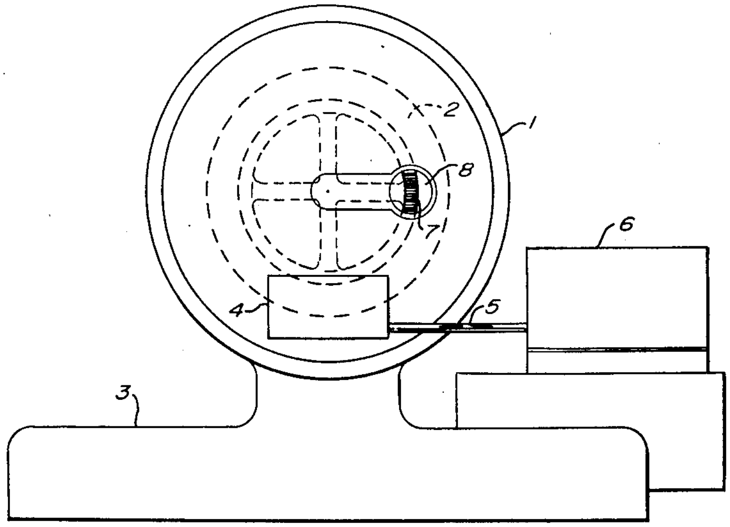
Fig. I
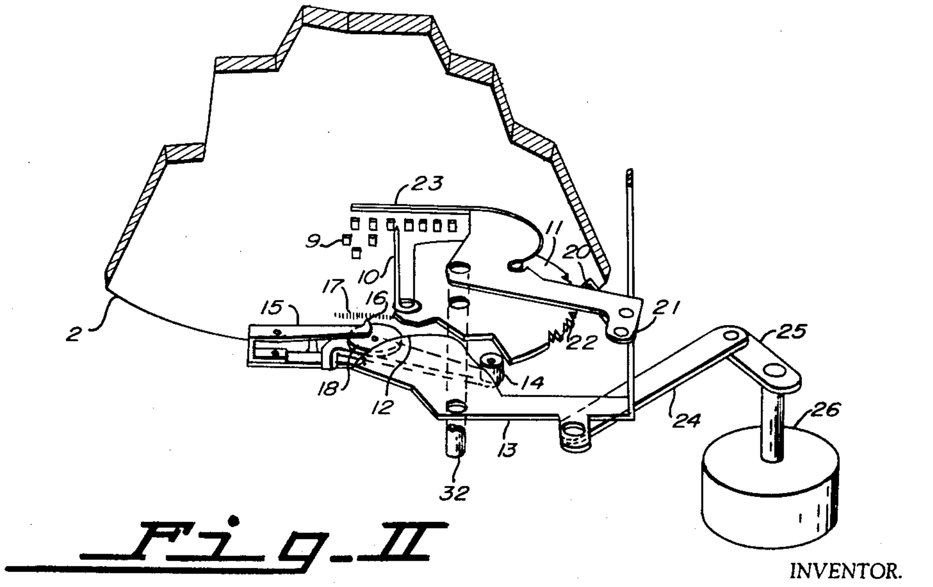
Fig. II
INVENTOR.
LAWRENCE S. WILLIAMS
BY
Marshall, Marshall & Yeasting
ATTORNEYS Dec. 4, 1962 L. S. WILLIAMS 3,066,860
CHART READING MECHANISM
Original Filed June 24, 1957
6 Sheets-Sheet 2
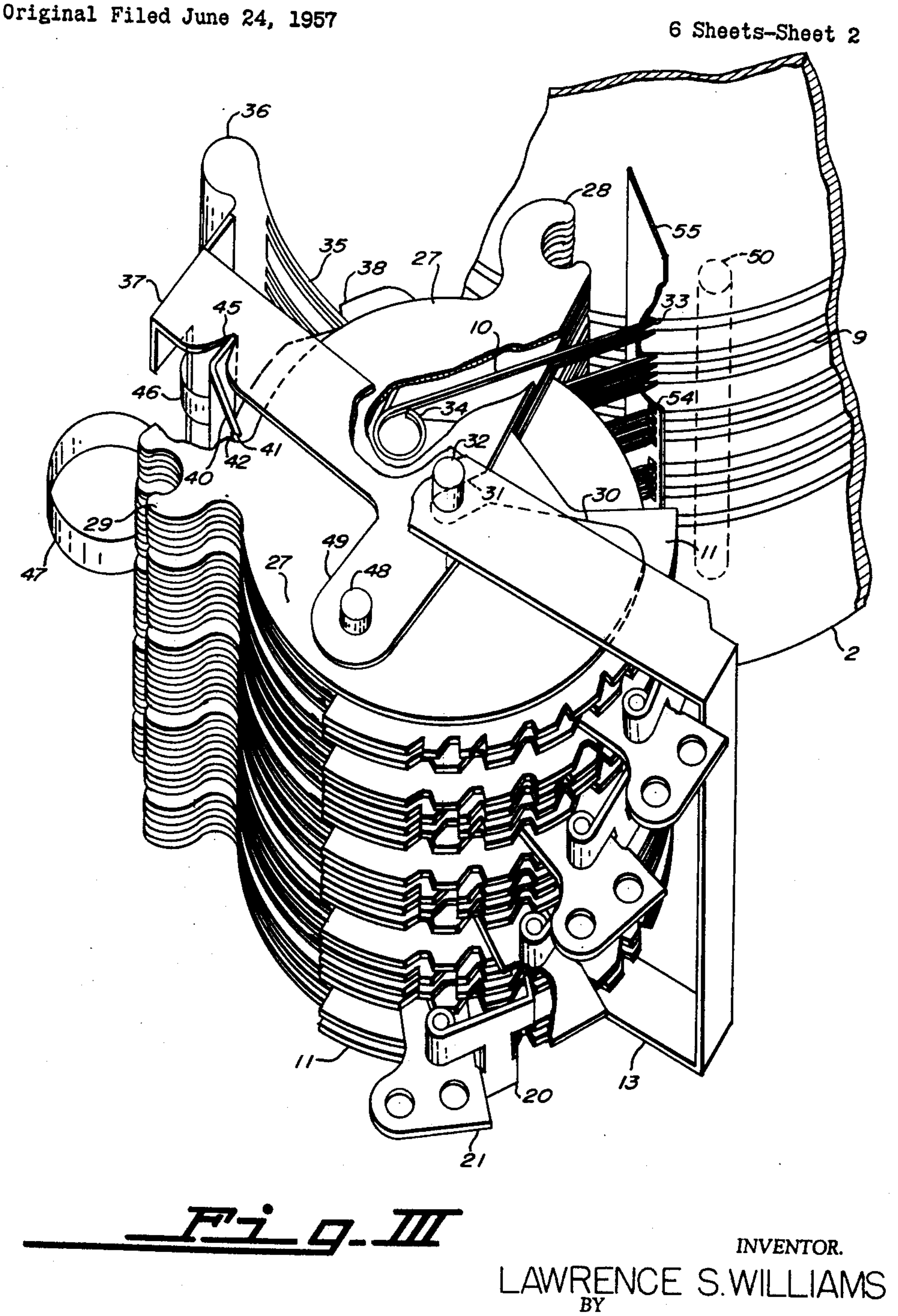
Fig. III
INVENTOR.
LAWRENCE S. WILLIAMS
BY
Marshall, Marshall & Yeasting
ATTORNEYS

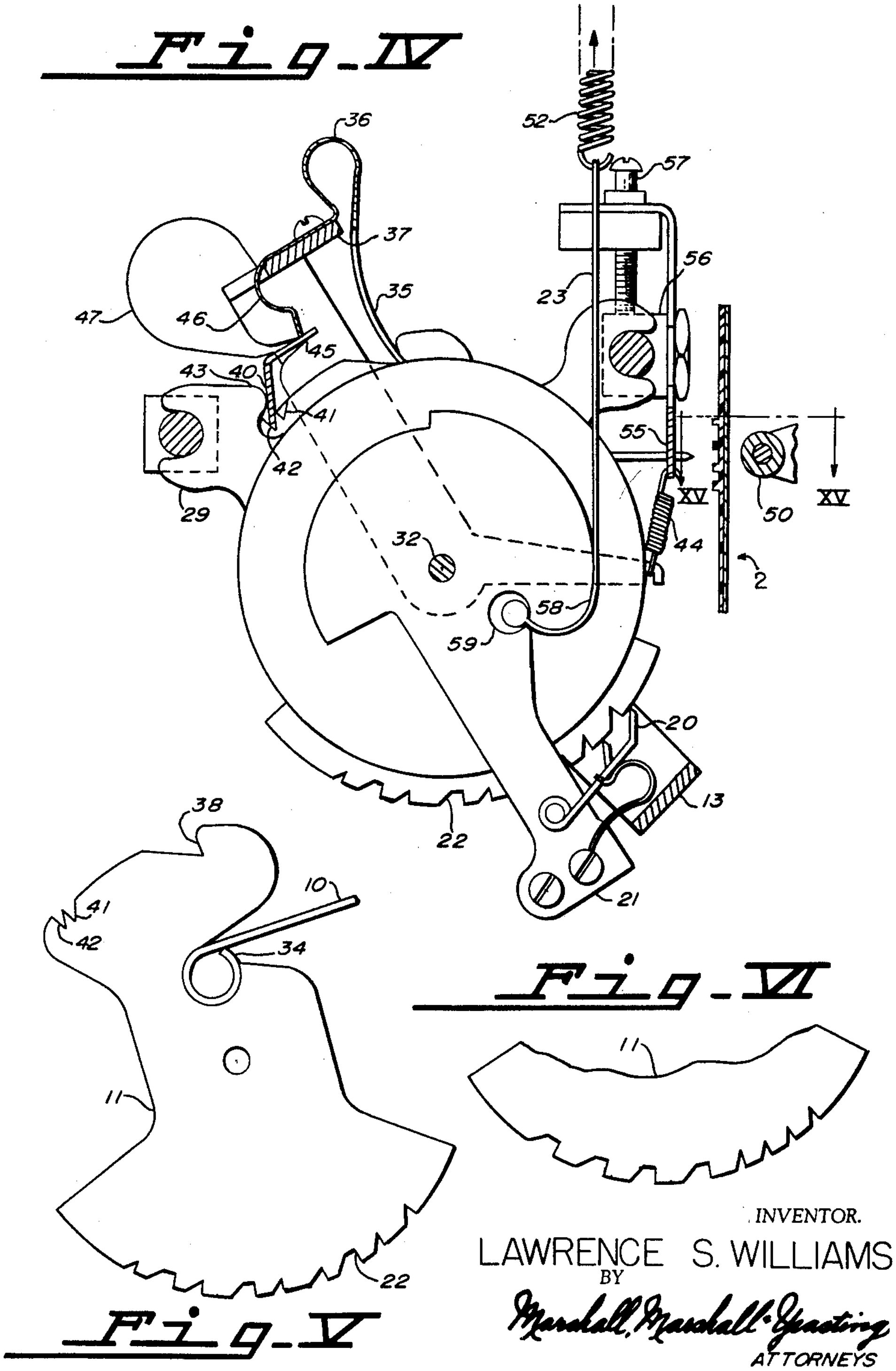
Fig. IV, Fig. V, Fig. VI
INVENTOR.
LAWRENCE S. WILLIAMS
BY
Marshall, Marshall & Yeasting
ATTORNEYS

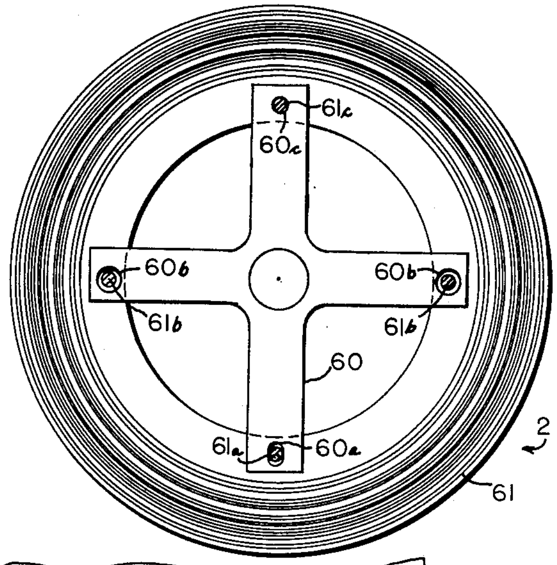
FIG. VII
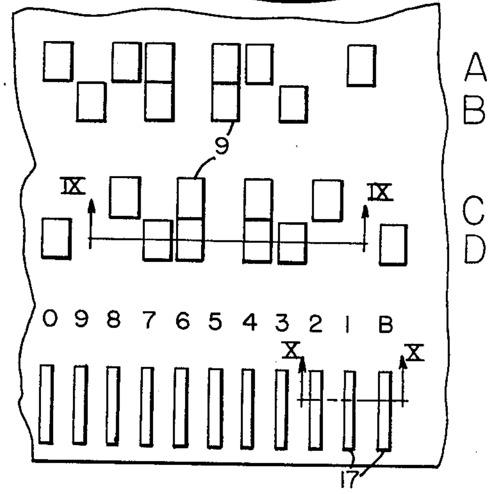
FIG. VIII
| CODE | | | | |
|---|---|---|---|---|
| | A | B | C | D |
| BLANK | | | | D |
| 0 | A | | | D |
| 1 | A | | | |
| 2 | | | C | |
| 3 | | B | | D |
| 4 | A | | C | D |
| 5 | A | B | | |
| 6 | | | C | D |
| 7 | A | B | | D |
| 8 | A | | C | |
| 9 | | B | | |
FIG. XI
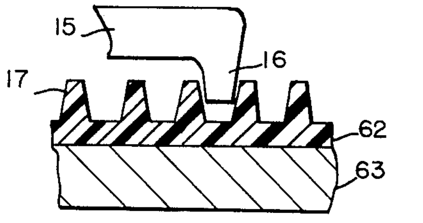
FIG. X
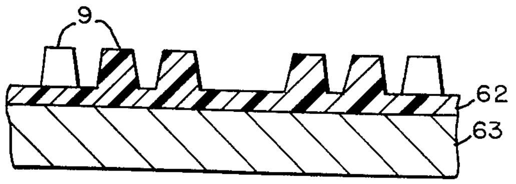
FIG. IX
INVENTOR.
LAWRENCE S. WILLIAMS
BY
Marshall, Marshall & Yeasting
ATTORNEYS Dec. 4, 1962 L. S. WILLIAMS 3,066,860
CHART READING MECHANISM
Original Filed June 24, 1957
6 Sheets-Sheet 5
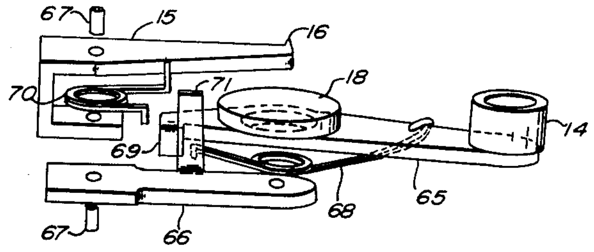
Fig. XII
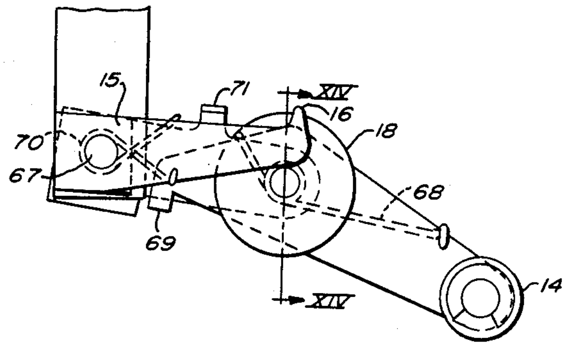
Fig. XIII
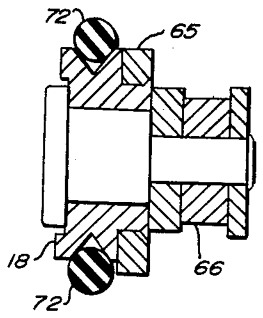
Fig. XIV
INVENTOR.
LAWRENCE S. WILLIAMS
BY
Marshall, Marshall & Yeasting
ATTORNEYS Dec. 4, 1962 L. S. WILLIAMS 3,066,860
CHART READING MECHANISM
Original Filed June 24, 1957 6 Sheets-Sheet 6
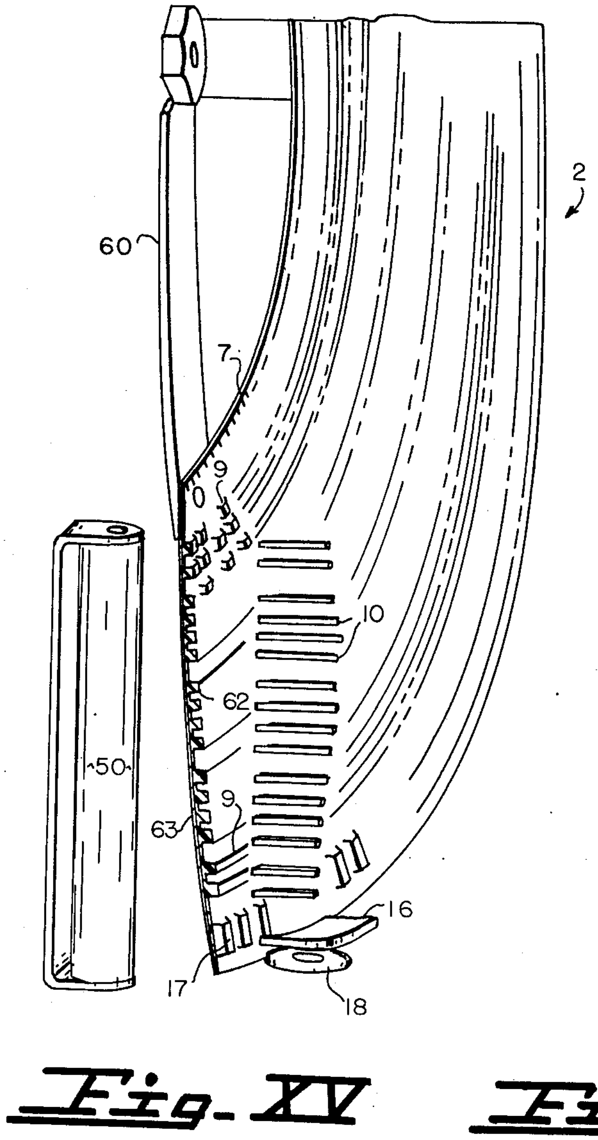
Fig. XV
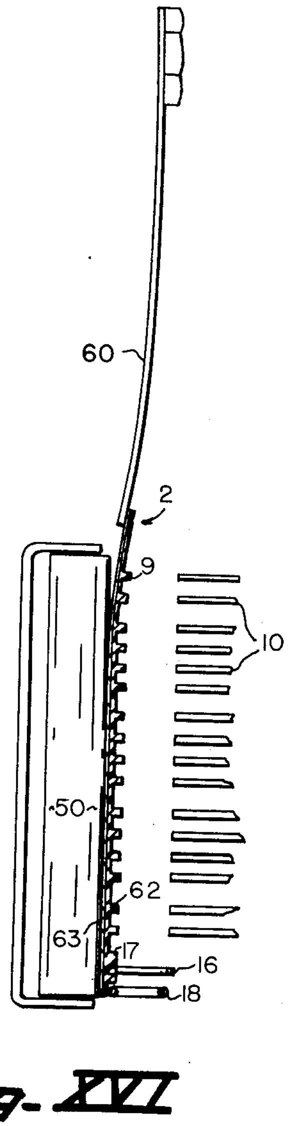
Fig. XVI
INVENTOR.
LAWRENCE S. WILLIAMS
BY
Marshall, Marshall & Yeasting
ATTORNEYS 3,066,860
Patented Dec. 4, 1962

3,066,860
CHART READING MECHANISM

Lawrence S. Williams, Toledo, Ohio, assignor to Toledo Scale Corporation, Toledo, Ohio, a corporation of Ohio Continuation of application Ser. No. 667,595, June 24, 1957. This application Nov. 20, 1961, Ser. No. 155,235
6 Claims. (Cl. 235—1)

This invention relates to mechanical chart reading devices.

As industrial processes and inventory control using condition responsive instruments become more and more exact there is a need for a corresponding increase in the accuracy of reading and recording the indications of the instruments. While the reading device constructed according to the invention may be applied to various types of condition responsive mechanism it is, for illustrative purposes only, described in connection with its use in a weighing scale for reading the graduations of a chart that moves according to the weight of a load being weighed and setting mechanism for visual display or printing of weight indications in digital form. The accuracy of a digital indication is limited only by the number of places into which the recording may be resolved. In order to get high accuracy it is necessary to graduate the chart with finely spaced graduations and the difficulty of reading, particularly by mechanical means, is thereby materially increased.

The basic chart reading device with which the invention is concerned is disclosed in abandoned application Serial No. 616,517 filed on October 17, 1956, the present application being a continuation of abandoned application Serial No. 667,595 filed on June 24, 1957 which is a continuation-in-part of such application Serial No. 616,517, and includes a permutation disk assembly having a plurality of disks for each order in the result which disks are set by momentary contact with relatively raised and depressed surfaces of a chart and are arranged to be sensed by and control the movement of a member the travel of which corresponds to the digital value of the graduation being sensed.

The present invention provides a flexible annular chart of nonplane form having a front portion carrying raised indicia and a back portion, means mounting the chart for rotation, backup means adjacent such back portion, means for straightening the indicia-bearing portion of the chart by engaging such front portion and moving such back portion against the backup means, and means for sensing the indicia on such straightened portion of the chart.

Prior charts for weighing scales were usually printed by an offset printing process before etching. Certain disadvantages are inherent in this method because the rubber roller which transfers the image of the indicia from the master to the chart tends to produce a slightly oval reproduction even though the master is perfectly circular. If the charts are to be used in ordinary printing scales so that the indicia on the charts must serve as type, or if the charts are to be used in connection with the chart reading device embodying the invention, which converts information from the charts into a form suitable for operating indicating or recording devices, so that raised graduations suitable for sensing by such reading device must be on the charts, the charts may be produced by a photoengraving process, i.e., the characters or graduations are printed by an ordinary printing method to apply a coating unaffected by etching fluid and then the charts are etched. The etching process, however, is not entirely satisfactory because the etching fluid tends to work back under the resistant printed on the surface and, thus, produce a fuzzy edge on the characters or graduations. This fuzzy edge tends to reproduce in the printed record of the weighings, in ordinary printing scales, so that the imprint on the tickets is not as sharp as may be desired, or the fuzzy edge, when used in connection with the reading device embodying the invention, cannot be sensed accurately by the reading device's feeler pins.

It is, accordingly, the principal object of this invention to provide an improved movable chart having relatively raised and depressed surfaces suitable for sensing by and in combination with reading means that sense the chart axially and that converts such information as received from the condition responsive member into a form suitable for operating indicating or recording devices.

Another object of the invention is to provide a reading device having the ability to read accurately a movably mounted chart that has any nonplane form such as a dish shape or an S shape.

Other objects and advantages will be apparent from the following description in which reference is had to the accompanying drawings.

A preferred form of the invention is illustrated in the accompanying drawings.

In the drawings:

FIGURE I is an elevation of a weighing scale dial mechanism showing the location of the reading device and a recording device operated thereby as they are mounted on a weighing scale mechanism;

FIGURE II is a fragmentary schematic diagram to illustrate some of the operating principles of the reading device;

FIGURE III is a diametric view of the permutation members and the drive mechanism therefor to show their cooperation with each other and with the chart;

FIGURE IV is a horizontal section through the lower portion of the assembly of permutation members to show the cooperation between the permutation members and the drive therefor;

FIGURE V is a plan view of one of the permutation members to show its notch pattern;

FIGURE VI is a fragmentary plan view of the notched portion of another permutation member to show a second notch pattern;

FIGURE VII is a front elevation at reduced scale of the weighing scale chart suitable to be mechanically sensed axially by the permutation reading device;

FIGURE VIII is an enlarged fragment of the graduated portion of the weighing scale chart illustrated in FIGURE VII;

FIGURE IX is a section at enlarged scale taken substantially along the line IX—IX of FIGURE VIII to illustrate the shape of the individual chart graduations;

FIGURE X is a section at enlarged scale taken along the line X—X of FIGURE VIII to show the shape of locating notches employed to locate the chart prior to taking a reading;

FIGURE XI is a table showing the permutation code used for each of the graduations of the chart;

FIGURE XII is an exploded view of locating mechanism employed to center the chart graduations prior to taking a reading so as to avoid any possibility of selector pins of the permutation members failing to properly engage the chart graduations;

FIGURE XIII is a plan view of the locating device;

FIGURE XIV is a vertical section along the line XIV—XIV of FIGURE XIII;

FIGURE XV is a more or less schematic perspective view as seen from a position along line XV—XV of FIGURE IV looking in the direction indicated by the arrows before the reading device's sensing cycle has begun; and FIGURE XVI is a perspective view of the device which is illustrated in FIGURE XV after the sensing cycle has begun showing the locating mechanism centering the chart graduations prior to taking a reading.

These specific figures and the accompanying description are intended merely to illustrate the invention and not to impose limitations on its scope.

For the purpose of illustration, the reading device is shown in connection with an ordinary dial type weighing scale. Such a scale comprises a dial housing 1 that contains automatic load counterbalancing and indicating mechanism which may include an annular chart 2 that is rotated through increments of angle that are proportional to increments of weight applied to the scale. The chart housing 1 is mounted on the top of a scale column 3 of which only the top portion is shown in FIGURE I.

The chart reading mechanism is contained within a housing 4 attached to the dial housing 1 and is connected through a conduit 5 to a printer or other utilization device 6 which is to be operated according to the scale readings. The chart 2 has on its face a series of graduations 7 that are visible through a magnifying lens 8 to provide visual indications of the load on the scale. The face of the chart 2 is also provided with molded graduations or indicia 9 consisting of relatively raised and depressed surfaces, as shown in greater detail in FIGURES VIII, IX and X, constituting the indicia that are sensed by the reading device contained within the housing 4.

FIGURE II shows in schematic form one of each of the essential elements of the reading device while FIGURE III shows a complete assembly of the sensing and selecting portions of the reading device. Referring first to FIGURE II, a reading of the chart 2 is taken by first advancing a series of sensing pins 10, one of which is shown, by spring-urged rotation of permutation disks 11 to positions at which they are arrested by engagement of the sensing pins 10 with the indicia 9 of the chart 2. Prior to the engagement of the sensing pins 10 with the indicia 9, a cam 12 forming part of a drive member 13, through engagement with a roller 14, drives a resiliently mounted finger 15 toward the chart until its tip 16 engages a row of raised teeth 17 and comes to rest either between adjacent teeth or on the crest of a tooth. Continued motion of the cam follower 14 turns a rubber tired wheel 18 in a direction tending to move the chart 2 so that the tip of the finger 16, if it had lodged on a crest of a tooth 17, is permitted to enter the space between two of the teeth and thus locate the chart 2. If the tip 16 were already engaged in a space between two of the teeth 17, the wheel slips leaving the chart 2 in position with the corresponding graduation centered in the path of the sensing pins 10. Thus, the pins 10 either enter squarely into the spaces between indicia 9 or onto the crests depending upon the coding of the indicia for that particular graduation.

After the permutation disks 11 are retracted without disturbing their relative positions as determined by the engagement of the sensing pins 10 with the chart 2, search pawls 20, one for each decade, carried on pawl arms 21 and each cooperating with four of the permutation disks 11 search notches 22 in the peripheries of the permutation disks 11. As each pawl finds aligned notches in its set of four permutation disks 11 it stops the pawl carrier in a position corresponding to the particular graduation of the chart being sensed. The stopped pawl carriers, through their connections through cables 23, position a reading device or indicating device according to the sensed graduation.

The movement of the drive member 13 is produced and controlled by a connecting rod 24 and crank 25 driven by a motor 26 equipped with controls to cause it to drive the crank 25 through one revolution for each start signal.

The sequence of steps in thus taking a reading from the chart 2 is to energize the motor such that it turns the crank 25 and thus oscillates the drive member 13. This oscillation first drives the cam follower 14 and finger 15 toward the chart to locate it with a graduation accurately in line with the sensing pins 10. During the oscillation of the drive member 13 the permutation disks 11, four for each decade, are driven so that their respective pins 10 engage the chart and then are retracted without disturbing their relative positions with respect to each other to a locking position at which they are held while the searching pawls 20, one for each group of four permutation disks or one for each decade, search the peripheries of the permutation disks 11 for the aligned notches. Upon finding the aligned notches the pawls stop the respective pawl carriers 21 in proper indicating positions.

The whole combination or assembly of permutation disks and drive members is shown in greater detail in FIGURE III. The complete stack up of permutation disks 11 for a four place number includes sixteen of the permutation disks 11, four pawl carriers 21, and enough spacers 27 to separate each of the permutation disks 11 from its neighbor for from a pawl carrier 21 as the case may be. Thus, sixteen permutation disks 11 and four pawl carriers 21 plus an extra spacer at the top of the stack requires a total of twenty-one spacers 27. Each of the spacers is provided with bifurcated ears 28 and 29 adapted to slip into notches in support rods of a frame with the rods holding the spacers in alignment and in spaced relation. Each of the spacers also has an inwardly directed notch 30 on the side facing the chart that terminates in a narrow slot 31 adapted to fit into corresponding groove cut in an axle 32 on which the permutation disks 11 and pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The sensing pins 10 each has a pointed end 33 that is sharp enough to enter the spaces between alternate gradutions and yet blunt enough to avoid cutting the chart material and has its other end curled into a circular loop 34 that is a close sliding fit in a hole cut in the connected permutation disk 11 so that the pin moves in the manner of a flat ball and socket joint. This particular construction keeps the thickness of the permutation disk and pin a minimum so that it may fit between closely spaced adjacent spacers 27.

The permutation disks 11 are continually urged in a direction tending to drive the sensing pins 10 against the chart by spring teeth 35 of a comb spring 36 that is carried on a common pawl bail 37. The ends of the spring teeth 35 engage notches 38 in the permutation disks. Movement of the permutation disks 11 under the influence of the springs 35 is limited by a common pawl 40 that is carried in the bail 37 and arranged to selectively engage either of two notches 41 or 42 of each permutation disk 11 and lock it in position when the pawl engages hook-like portions 43 (FIGURES IV) of the bifurcated ears 29 as the bail 37 is urged counterclockwise, as seen in FIGURES III and IV, by a return spring 44 attached to its lower end. The common pawl 40 is held seated in pivot notches 45 of the bail 37 by a plurality of small spring 46 forming part of the comb spring 36 and attached to the bail 37. The pawl 40 is urged into engagement with the notches 41 or 42 by a light spring 47 also attached to the bail 37.

In operation, as the drive member 13 is swept clockwise as seen in FIGURES III or IV it collects the pawl carriers 21 from their previous positions and finally engages an upwardly directed stud 48 carried in an upper arm 49 of the bail 37 so as to drive the bail clockwise through a small distance against the tension of the return spring 44. During the initial movement of the bail 37 it and the permutation disks 11 move as a unit since the disks are held between the spring teeth 35 engaging the notches 38 and the pawl 40 engaging the notches 41 or 42. As the sensing pins 10 engage the chart 2 and drive it against a backup roller 50 the motion of the permutation disks 11 is arrested. The spring teeth 35 yield as the bail 37 continues and the pawl 40 leaves the notches 41 or 42 and slides part way along the smooth periphery of the permutation disks 11 between the notches 41 and 38. This motion is just far enough to make sure that the common pawl 40 is out of the notches. On the return motion of the drive member 13, the spring 44 pulls the common pawl bail 37 counterclockwise so that the common pawl 40 may enter the aligned ones of the notches 41 or 42 in each of the permutation disks according to whether the disk had been advanced by its pin finding a low spot in the chart or whether it had been arrested in the first position with the pin on the crest of a graduation. The continued motion with the common pawl 40 engaged in the permutation disks drives the disks in retracting motion until the common pawl 40 seats behind the hook-like portions 43 of the spacer ears 29. At this point the motion of the common pawl bail 37 is arrested and the permutation disks 11 are all locked in position.

Continuing motion of the drive member 13 allows the pawl carriers 21 to follow as urged by their drive spring 52, one of which is shown in FIGURE IV connected to its cable 23. The pawl carriers 21 move until their pawls 20 find aligned notches in a particular combination of permutation disks with which they cooperate. It is to be noted that the position of the aligned notch may vary according to the relative positions of the group of disks cooperating with each pawl.

The sensing pins 10 adjacent the chart 2 are guided in slots 54 of a guide plate 55 that is attached to a frame support 56 that serves as the spacing support for the bifurcated ears 28 of the spacers 27. The slots 54 are just wide enough to admit the pins and, thus, accurately guide them closely adjacent the chart 2. As indicated in FIGURE IV, the guide plate 55 is adjustable relative to the frame support rod 56 and is controlled by an adjusting screw 57 that works in opposition to the common pawl bail return spring 44.

The return springs 52 may be the springs in the printer mechanism to maintain tension on the cables 23 or if a commutator, not shown in the drawings, be attached to the pawl carriers 21 the spring 52 may be returned to the frame mechanism merely to apply tension to the cable 23 and do no other useful work. If a printer, as indicated in FIGURE I, is enclosed in the housing 6 the cables 23 are run through the conduit 5 from the selector mechanism in the housing 4.

Referring to FIGURE IV, each cable 23 is passed over an arcuate surface or periphery 58 of its pawl carrier 21 and its end is anchored in a hole 59 drilled through the pawl carrier. The spacers 27 hold the cable 23 from slipping off sideways. The radius of the arcuate surface 58 with respect to the axle 32 on which the pawl carrier is journaled is selected according to the desired travel of the cable 23 for each increment of indication and the spacing of the notches 22 which determine the angular travel of the pawl carrier.

The permutation disks 11 are made with either of two notch patterns and the selector pawls 20 are arranged with one of its teeth advanced two notch spaces ahead of the other tooth. By thus varying the spacing of the pawl teeth and providing the two different patterns for the selector disks it is possible to secure at least eleven different combinations to provide different stopping points for the pawl 20. FIGURES V and VI show the two notch combinations for the permutation disks 11. In the type shown in FIGURE V the notched periphery is divided into twenty-three equal spaces with notches appearing in the first, third, fourth, sixth, ninth, tenth, twelfth, fifteenth, seventeenth, eighteenth, twentieth, and twenty-third spaces counting from left to right. Likewise, the permutation pattern shown in FIGURE VI has notches appearing in the first, second, fifth, sixth, ninth, tenth, thirteenth, fourteenth, seventeenth, nineteenth, twenty-first, and twenty-third spaces. These particular notch combinations used in pairs with the offset pawl teeth operate according to the code set forth in FIGURE XI. This code is used in determining the location of the raised and depressed indicia for each of the graduations on the chart 2 to be sensed.

As shown in FIGURE VII, the chart 2 is an annular member carried on a spider 60 and having rows of graduations 61 on its marginal area. In order to allow for expansion and contraction of the chart 2 and the spider 60 relative to each other due to temperature changes, the spider 60 is slotted radially at 60*a* to loosely receive a rivet 61*a*, has openings 60*b* which loosely receive rivets 61*b*, and has an aperture 60*c* which fits snugly about rivet 61*c*. The rivets hold the chart 2 and the spider 60 together, the heads of the rivets being sheared off and the bodies of the rivets shown in section in FIGURE VII for clarity of illustration. The graduations or indicia are preferably molded in the face of the chart in the same manner as phonograph records are made with a plastic or other moldable layer 62 mounted on a metallic backing plate 63 and the graduations being formed in the plastic layer. The arrangement of graduations for a first fragment of the chart is illustrated in FIGURE VIII. This fragment, starting with the zero indicia of the chart, shows only those graduations in the units or lowest order decade and the row of teeth 17 for locating the chart. The teeth 17 along the marginal area of the chart cooperate with the locating finger 15 and have cross sections as shown in FIGURE X wherein each of the teeth is shown substantially as a conventional rack tool. The tip 16 of the locating finger 15 is formed as a mating tooth so as to seat firmly in the spaces between the teeth 17.

The indicia 9 with which the sensing pins 10 cooperate are of generally similar shape except for being formed of heavier section inasmuch as the locating pins do not have to fit into the spaces between teeth that are located on adjacent graduations. The chart section shown in FIGURE VIII, as was mentioned, includes that portion starting at the zero graduation which is shown at the right-hand edge. Inasmuch as there are no significant figures to the left of the zero when indicating the zero graduation it is desirable that the indicator show or the printer print a blank at this position. Therefore, the first graduation carries only the single raised portion in the bottom row or D row which, according to the chart shown in FIGURE XI, gives a blank for the output indication. The permutation disk combination for this graduation causes the aligned notch to appear at the end of the travel of the pawls 20 or at the last possible position at which an aligned notch may be formed. If an error is made such that the pawl does not find the aligned notch it overtravels and the printer indicates such overtravel by printing some distinctive symbol in place of a digit. The next graduation, a one, is indicated or denoted by a single raised indicia in the A row; likewise two is indicated by a single indicia in the C row; and the others follow according to the chart. It should be noted that the raised indicia of the chart cause the corresponding permutation disk 11 to be advanced counterclockwise one space as seen in FIGURES III or IV.

Other chart combinations may be employed besides the particular code indicated. However, this particular code was selected in order that the number of different parts could be reduced. Thus, with the selected code two each of the permutation disks 11, shown in FIGURES V and VI, may be employed in each decade in combination with the offset pawl 20. If the offset pawl were not employed then each of the four permutation disks cooperating for each decade would have to have its own combination of notches which would make four different parts to be stocked instead of two.

The plastic layer 62 is firmly attached to the metallic backing plate 63 either by molding it in place or by adhesively applying it. The plastic layer is then impressed in a molding operation with the rows or graduations 61. The metallic backing plate 63 has appreciable thickness and the moldable material 62 applied to its surface is of substantially the same thickness. The moldable material must be thick enough to take the full depth of the impressions to be molded therein without having the dies of molds extend through to the metallic supporting member.

Preferably, the plastic layer 62 is molded into form and applied to the backing plate 63 in one operation. Since heavy, rigid molds are required to mold the plastic layer these may be very accurately made so that the molded graduations 61 are precisely located around the chart and so that they are sharply formed, whereby the graduations are especially suitable for accurate sensing by the feeler pins 10.

The composite chart 2 is preferably constructed from hard aluminum alloy so that it is dimensionally stable and able to stand the pressures in the mold. The moldable material may be a soft metal alloy or any of the plastics which will adhesively bond to the aluminum. Ordinarily, a thermoplastic material is employed so that the graduations will be very accurately molded by the application of heat and pressure. Thermoplastic materials are preferred although thermosetting materials may also be used provided that they will adhere to the aluminum or other metal used for the stable support. Suitable materials for coating the mold surface are available to prevent adhesion of the molded layer of the chart to the mold.

The foregoing described construction for the chart 2 permits it to be made at a small cost and with an accuracy that is limited only by the accuracy of the master die that is used to construct the molds. Since this die may be very accurately machined and since there is no loss of accuracy in transferring from the master die to the mold die, it follows that the molded charts are very accurate in dimension and will maintain that dimensional accuracy in use.

Various modifications of construction and substitutions of material in the chart 2 may be made without losing the advantages that are obtained by using a high-strength dimensionally stable material as a backing sheet or support and molded onto a marginal area thereof a layer of moldable material only sufficiently thick to receive the impressions of graduations or indicia to be placed thereon.

The chart locating mechanism is illustrated in greater detail in FIGURES XII, XIII and XIV. Referring to FIGURE XII, the cam follower 14 is mounted on the end of a forearm 65 that also carries, as a rigid part thereof, at its elbow end the drive wheel 18 that engages the chart to urge it forward so as to move any tooth 17 falling below the finger tip 16 out of the way and allow the tip 16 of the finger 15 to fall into the space between adjacent teeth 17. The arm 65 is pivotally connected through an elbow joint at the axis of the wheel 18 to a second arm 66 which in turn is pivoted on and, by a spring not shown, is continually urged clockwise about a pin 67 fixed in the framework of the scale. A spring 68 at the joint or elbow at the wheel 18 urges the forearm 65 clockwise with respect to the second arm 66 so that the wheel bears against the chart 2 before the elbow joint starts to turn. The spring urged movement of the forearm 65 relative to the second arm 66 is limited by a down turned ear 69 on the tail end of the forearm 65 that engages the front surface of the lower arm 66. Normally, the spring 68 rotates the forearm 65 to maintain the ear in engagement with the lower arm. However, when the mechanism is pushed toward the chart by the cam pushing on the cam roller 14 the lateral motion of the wheel 18 is arrested and the cam force against the cam follower 14 then rotates the arm 65 around its connection with the lower arm 66 thus producing the relative rotation of the wheel 18.

The finger 15 with its tip 16 is carried on the pin 67 and is urged toward the chart by a spring 70 acting between the lower arm 66 and the finger 15. The forward movement of the finger 15 is limited by a stop 71 erected from the rear portion of the lower arm 66 in position to engage the chart side of the finger 15.

FIGURE XIV is a section taken through the elbow joint between the arms 65 and 66 and shows a rubber tire 72 mounted on the wheel 18 so as to increase the tractive effort of the wheel on the chart.

In the operation of this mechanism the spring 68 is made stiff enough so that when the wheel 18 engages the chart it pushes the chart back against the backup roller 50 before the spring 68 yields and permits the arm 65 to turn relative to the arm 66. This insures that sufficient force is exerted against the chart to cause it to move even though the tip 16 of the finger 15 should be partially caught on the corner of the crest of a tooth. It is necessary that sufficient force be exerted at the time so that the tip of the finger 15 will slide across the crest of a tooth 17 and firmly engage in the valley against the side of the next tooth 17.

The metallic backing plate 63 of the chart 2 is pre-spun to a nonplane, dished form with the layer of moldable material 62 molded on the concave, front side as illustrated in FIGURE XV. The nonplane form is important because it has been found that a flat chart of the diameter and thinness needed warps and acts like the bottom of an oil can during temperatures changes. The chart must be made thin to reduce the inertia and for good flexibility so that good contact is made between the back of the chart and the backup roller 50 when the chart is sensed by the reading device. Such good contact is enhanced by the fact that the chart is molded on its concave side, and is very important in order that the total movement of all of the sensing pins 10 may be determinate and may be made with a minimum of effort. The chart may have any nonplane form such as an S shape, the reading device having the ability to read accurately a chart that is warped into any nonplane form. The chart is made from thin, light-weight material to reduce the inertia, but which warps easily, and wobbles back and forth as it passes by the sensing pins. Nevertheless, the reading device by straightening the indicia-bearing portion of the chart is able to read the chart accurately.

The concave chart 2, in its position shown in FIGURE XV, is free to rotate through increments of angle that are proportional to increments of weight applied to the scale, the chart reading mechanism being shown in its idle stage, i.e., the rubber tired wheel 18 and the finger tip 16 of the locating mechanism and the sensing pins 10 are illustrated in their normal positions prior to a sensing cycle.

FIGURE XVI is an illustration of the relative positions of the elements during the first stage in the sensing cycle. In the first stage, which is prior to the engagement of the sensing pins 10 with the indicia 9, the finger tip 16 is driven toward the chart 2 until it engages the row of raised teeth 17 and comes to rest either between adjacent teeth 17 or on the crest of a tooth 17. Continued motion of the cam follower 14 (FIGURES XII and XIII) turns the rubber tired wheel 18 in a direction tending to move the chart 2 so that the finger tip 16, if it had lodged on a crest of a tooth 17, is permitted to enter the space between two of the teeth and, thus, locate the chart 2. If the tip 16 were already engaged in a space between two of the teeth 17, the wheel slips leaving the chart 2 in position with the corresponding graduation centered in the path of the sensing pins 10. As shown in FIGURE XVI, the rubber tired wheel 18 is pushing the concave chart 2 back against the roller 50 and the tip 16 is engaged in a space between two of the teeth 17. In the next stage in the sensing cycle, the pins 10 are advanced to read the already pushed back chart 2.

The flexibility of the chart 2 makes possible the good contact between the chart and the backup roller 50 which is illustrated in FIGURE XVI. Such prior contact of the chart and the roller leaves little work for the sensing pins 10 to do, the upper ones of the pins 10 finishing the task of completely pushing the chart back.

The construction and form of the chart permits the use of extremely small graduations on the chart and, hence, a large number of such graduations without requiring correspondingly accurate alignment of the chart as a whole. Thus, the chart may run out or wobble a distance several times the depth of the chart graduations without affecting the accuracy of the readings. A twisted, wobbling chart which is pushed back against a stop and then sensed is believed to be unknown in the prior art.

Various modifications in the structure may be made without losing the advantages of the structure disclosed or departing from the scope of the invention.

Having described the invention, I claim:

1. In a mechanical chart reading device, in combination, a flexible annular chart of dished form having a concave portion carrying raised indicia, means connected to said chart for mounting said chart for rotation, backup means positioned radially adjacent the convex side of said chart, means for straightening the indicia-bearing portion of the chart by moving such convex portion against the backup means, and means for sensing the indicia on such straightened concave portion of the chart.

2. A mechanical chart reading device according to claim 1 wherein the raised indicia are selected according to a binary code.

3. A mechanical chart reading device according to claim 1 wherein the chart has a composite structure.

4. In a mechanical chart reading device, in combination, a flexible annular chart of nonplane form having a front portion carrying raised indicia and a back portion, means mounting the chart for rotation, backup means adjacent such back portion, means for straightening the indicia-bearing portion of the chart by engaging such front portion and moving such back portion against the backup means, and means for sensing the indicia on such straightened portion of the chart.

5. A mechanical chart reading device according to claim 4 wherein the raised indicia are selected according to a binary code.

6. A mechanical chart reading device according to claim 4 wherein the chart has a composite structure.

References Cited in the file of this patent

UNITED STATES PATENTS

| | | |
|---|---|---|
| 385,887 | Tainter | July 10, 1888 |
| 1,496,258 | Ewing | June 3, 1924 |
| 1,950,187 | Mansel | Mar. 6, 1934 |
| 2,008,092 | Biber | July 16, 1935 |
| 2,169,213 | Backdahl | Aug. 15, 1939 |
| 2,308,927 | Maul | Jan. 19, 1943 |
| 2,374,790 | Terry | May 1, 1945 |
| 2,453,239 | Luhn | Nov. 9, 1948 |
| 2,678,895 | Belar | May 18, 1954 |
| 2,792,275 | Drillick | May 14, 1957 |